No. 865,482. PATENTED SEPT. 10, 1907.
J. P. DELPHEY.
WIRE PAY-OUT REEL.
APPLICATION FILED APR. 8, 1904.
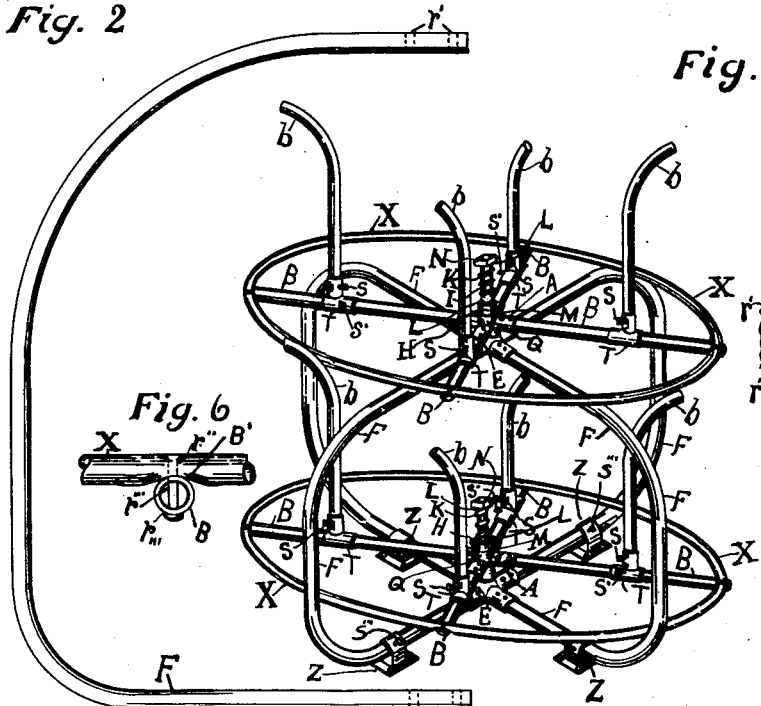
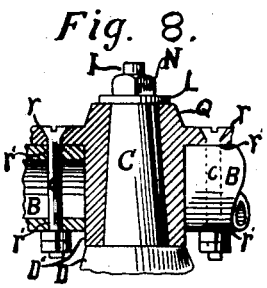
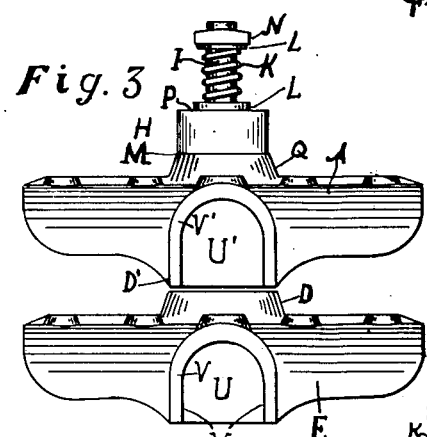
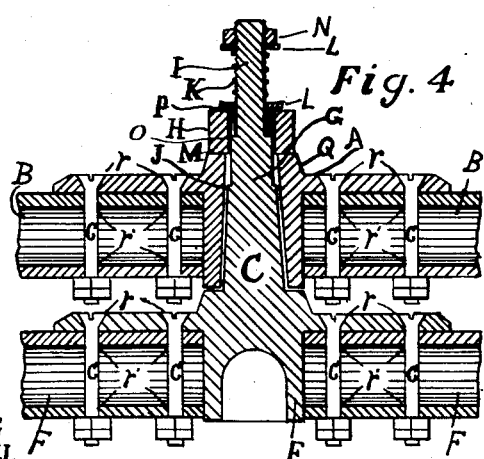
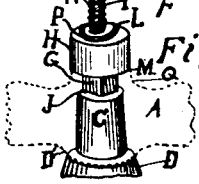
WITNESSES.
Wilbur G. Thurston
H. C. Haskins
INVENTOR.
John P. Delphey

UNITED STATES PATENT OFFICE.

JOHN P. DELPHEY, OF TOLEDO, OHIO.

WIRE-PAYOUT REEL.

No. 865,482.     Specification of Letters Patent.     Patented Sept. 10, 1907.

Application filed April 8, 1904. Serial No. 202,266.

*To all whom it may concern:*

Be it known that I, JOHN P. DELPHEY, a citizen of the United States, and a resident of Toledo, in the county of Lucas and State of Ohio, have invented certain new and useful Improvements in Wire-Payout Reels, of which the following is a description.

The object of my invention is to provide, 1st. A strong, durable, inexpensive, light frame for a combination of two wire pay-out reels that will occupy but little space, be convenient to handle and move about, simple and economical in its construction and will not easily get out of order. 2nd. A combination of two wire pay-out reels in one metal frame for convenience in use in telephone, telegraph and other purposes where it is desired to pay out two wires or threads at once. 3d. A convenient support by which the reel may be attached to carrying handles, or to a wagon bed or other surface. 4th. A combination of parts of two wire pay-out reels in a frame, more serviceable, more convenient and more durable, than any other of its class.

With these and other objects in view the invention consists of certain new and novel features of construction, combination and arrangement of parts which will hereinafter be more fully described and particularly pointed out in the appended claims.

Figure 1. is a complete combination of two wire pay-out reels, or a tandem reel, in elevation; herein shown as tension reels. Fig. 2. is a side view of one of the combination legs connecting and supporting both reels. Fig. 3. is an elevation of a reel hub and pivot parts of a reel and to which arms and legs are attached at the concave parts,—two of which concavities are shown in the foreground. Fig. 4. is a reel hub and pivot parts in section, with tension attachment,—to which the hub and pivot parts with arms and legs are attached at the concave parts,—the arms and legs are broken off but showing the manner of attaching the arms and legs to the hub and pivot castings with a form of pivot and hub and their immediate connections. Fig. 5. is an elevation of the base or supporting casting. Fig. 6. is a perspective of the outer end of the reel arms, showing a broken-off portion of a band or hoop and a manner of connecting the same with the reel arm. Fig. 7. is a perspective of the upper part of a reel and pivot with tension attachment with part of the reel base broken off, and the hub or swivel in outline with part broken off. Fig. 8. is reel pivot and hub,—part in section and part in elevation, with legs, part of the base, and part of the arms broken off, showing another pivot form and corresponding hub.

Similar letters refer to similar parts throughout the several views in the accompanying drawings.

Each F. is a combination leg of the double, or tandem,-reel, and each of these legs is fastened to its respective reel base E. by bolts or rivets $c$, through the corresponding holes $r'$ respectively at the ends of each combination leg F. and through the corresponding holes $r$, in the casting arm of its corresponding reel base.

Each leg extends outwardly from its reel base and then downwardly or upwardly, according to the method of commencing at the upper or lower reel, until sufficient space is provided between the upper and lower reels to permit a coil of wire to be readily inserted between the base of the upper reel and the upper parts of the lower reel between the combination legs and the outside of the periphery of the revolving parts of the reel, and then the leg is extended inwardly until it reaches its proper place at the base of the other reel to which it is fastened, and to the base of the upper reel, by bolts or rivets through holes in the combination leg and corresponding holes in each of the reel bases thereby making supports of one continuous piece for both reels with no joints in the combined leg to break or get out of order, and be not only more durable but more economically and rapidly constructed than by forming such combination parts of weldings or fittings or otherwise.

Fig. 5 shows one form of the casting for a reel base Y. whose construction can be readily judged from the drawing, and on three or more of which the entire combination reel may be supported, as shown on four of them in Fig. 1. It is slipped over the leg of the lower reel by means of the hole $y$. and is held in place by the set screw $s'''$ and rests on its flange base Z. One or more bolt holes perforate the flange base as desired. By adjusting the combination reel to some substantial base, adjusting the flange of the casting base thereto, and fastening it thereto by heavy nails, screws or bolts, and adjusting the set screws to each casting base, the reel will be given further rigidity, or it may be placed on a frame on wheels and be carted about, or on handles and be carried about. The remainder of the combination or tandem reel, is the two reels whose central parts are represented by A E. These may differ from each other or may be exactly alike and duplicates, and are here so represented and described and the description of one is, therefore, the description of the other.

Taking the lower one for the description, A. is the central revolving portion of the reel and bears the arms B. and on each arm the adjustable upright $b$., and the interior portion of the hub of which, conforms to and revolves about the cone shaped pivot C. and rests on the shoulder D'. and D. at its lower part and the lower part of the pivot C.

E. is the base of the reel pivot C. to which and about which is held the reel hub A. by the nut N. and the washer L. on the extension of the reel pivot C. The reel base E. and the reel itself is supported by the metal legs F. each fitting into its respective socket or cavity as V. and against its surface and squarely against the metal at the inner end of the concavity at U. making the fastening very firm and the attaching bolts or rivets acting squarely and firmly. The legs and arms are each attached alike to their respective parts of the reel parts A. and E. by means of the sets of attaching bolts or rivets c c. through corresponding holes r r. in the concave arms in the central castings and the corresponding holes r'. r' in the attached arms and legs respectively, consisting of two or more holes and bolts or rivets through each casting arm of the central parts for the attached metal arm or leg, thereby holding the same together rigidly and not liable to get out of order.

T. is an adjustable L-piece or joint with set-screw s. in the upper and set-screw s' in the lower branch thereof, one for regulating the position of the upright in the L and the other for regulating the position of the L on the arm.

X. is a reel band fastened to the outer part of the reel arms B. at B'. where is also a concavity in the reel band or hoop at its junction with the reel arm B. so that the thickness of the band may not rise too high above the surface of the reel arm B. and interfere with the wire paying out when the reel in use.

r'' r''' r_{111} are holes through the band and reel arms, respectively, through which are fastened the bolts or rivets which hold the parts together, the hole in the band at r'' being countersunk, as indicated, to permit of a bolt or rivet being used with head diverging from the body of the bolt or rivet and fitting into the countersunk hole and permitting of a straight flat surface on top of the reel band or hoop.

One or both of the central parts of the reel may be a tension reel wherein (as in illustration shown) the middle portion of the pivot C. is so formed by squaring, serrating, channeling, fluting, grooving, or otherwise, that while it permits the tension washer H. with corresponding formation of its inner surface, to slide back and forth at or nearly in line with the pivot axis, it cannot revolve about the pivot axis. Above this transformed portion of the pivot C. is a round threaded portion I. of the reel pivot, extended and working on which is the threaded bur or nut N. Around the extended portion of the pivot between the nut N. and the tension washer H. is the spring K. When coiled wire spring or rubber is used, one or both ends thereof may be protected by washer caps or washers L L. This spring is pressed down on or releases the tension washer H. from its point of contact M. with the central part of the revolving part of the reel by turning the nut N. so as to compress the spring K. or by turning the nut N in the reverse direction to release the spring K. The nut N. may operate directly on the tension washer H. without the intervention of a spring K. or one or both protecting washers L. L, though in practice I prefer the addition of the spring K and the washers L, L.

The transformed portion G. of the reel pivot C. is extended some little distance below the contact surface M. of the revolving part of the reel to J. and above the tension washer surface M, of the revolving part of the reel to O. but below the upper surface P. of the tension washer H, not so far as to interfere with the revolution of the reel on its pivot, but permitting the tension-washer H. to slide back and forth and down the transformed portion of the pivot C. and produce a tension of the reel and also to take up the wear at the point of contact M. of the tension washer and revolving part of the reel and the contact of the revolving part of the reel at the shoulder D. on the base E. of the reel at the lower end of the pivot C.

At Q is a slight elevation or shoulder on the upper portion of the reel at its point of contact M. with the tension washer H. which gives greater durability to the reel by providing more stock at the tension wearing parts both at the upper and lower contact surface of the revolving part of the reel. The shoulder at D. keeps the revolving portion of the reel from coming into too close contact with the base E. when the reel is in motion, and by elevating it a little above the requirements to just clear, permits the cone-shaped bearing (pivot C) of the reel to settle down on and into closer contact as the same wears, thus permitting and producing practically the same degree of friction between the cone bearings after as before worn.

In operating the mechanism, the steps will be taken in different rotation by different operators and the operators will eliminate consecutive steps at different times and some all the time. Both the upper and lower reel, when similar, may be operated similarly,—the only difference being that the roll of wire is lifted between any two of the combination legs when loading or unloading the lower reel. I will therefore describe the operation as to one reel, taking the lower reel. One way is to loosen as many of the set screws s' on as many of the arms as desired: the L s. and the uprights may be moved along its arm B. respectively to or from the center of the reel as the circumstances require. Then loosen the set screws s. on as many of the L s. as desired and turn upper part of the uprights b. towards the center of the reel. When the uprights are sufficiently adjusted that a coil of wire may be loosely slipped over the same, it is placed over the uprights, round them and on the arms B. The L s. are then re-adjusted, the upper ends of the uprights turned outwards, the uprights pressed tightly against the surrounding wire and the set screws s' and s tightened and, in case of a plain reel, the mechanism is ready to pay off wire at the will of the operator, so far as that reel is concerned, by the operator drawing the wire from a loose end after the withholding bands cut. In the tension reel, as illustrated, before the wire is to be drawn from the reel, adjust the tension by screwing down or up on the nut N. according to whether the tension is desired tighter or looser, until about the desired tension is obtained. By repeating the process with the other reel, the two will be able to be worked at the same time, except, of course, when loading the upper reel, it is loaded freely without the legs F, being in the way. The tension, or tensions, can be then readily adjusted, as is evident. To remove a coil of wire release the set screws s, in as many of the L s. as desired on that reel, turn in the loosened uprights b, in the L s. and lift off the wire. The upright b. can be lifted out of its socket in the L., if desired, either when removing the wire or loading the reel. Other items of detail in handling the reel will be regulated by the habits and methods of the operator.

From the foregoing description, taken in connection with the accompanying drawings, the construction, mode of operation and advantages of the invention will be readily understood, without requiring more extended explanation.

In practice I prefer to use two-hole arm castings, round metal tubing for arms, legs and uprights,—the arms and legs attached to the central parts of the reel parts by flat-headed stove-bolts and lock nuts, though it is obvious that metal of various formed sections may be used for arms, legs and uprights and differently bent, from that illustrated in accompanying drawings and herein described, and the legs and arms fastened to the central casting arms by various kinds of bolts or rivets The supporting base Y. may be of various forms and may be a mere strap-iron over the leg fastening it to some base. Other forms of pivot and hub may be used and other combinations and forms of tension appliance also, as well as the place of the pivot and socket reversed, likewise a bolt may be used perforating both the base and revolving part of the reel, with nut and tension attachment at either end, or held by a pin with or without a washer, thus holding the parts together and the tension device becoming operative at the same time, and still other changes may be made in the various mechanical devices, in form, proportion and details of construction which will be within the scope of this invention without departing from its spirit or sacrificing the advantages thereof in any respect.

Having thus described my invention, what I claim and desire to secure by Letters Patent is:—

1. In a wire pay-out reel, a frame comprising a plurality of substantially U-shaped members joined together at their ends, pivots supported at the juncture of said ends, and reels rotatable upon said pivots.

2. In a wire pay-out reel, a frame comprising a plurality of substantially U-shaped members assembled with their ends adjacent to each other, pivot bases connecting said ends together, and reels rotatable upon the pivot bases.

3. In a wire pay-out reel, a plurality of substantially U-shaped members disposed in vertical planes radiating from a common axis and having their ends arranged in two groups adjacent to said axis, each group connected by and supporting a pivot, and a reel rotatable upon each pivot.

In testimony whereof I have signed my name to this specification in the presence of two subscribing witnesses.

JOHN P. DELPHEY.

Witnesses:
C. J. FORSYTH,
C. R. SPRAGUE.